2 Sheets—Sheet 2.
F. M. DUNLAP & R. MAGILL.
Combined Speed and Distance Recorders and Indicators.
No. 196,643. Patented Oct. 30, 1877.
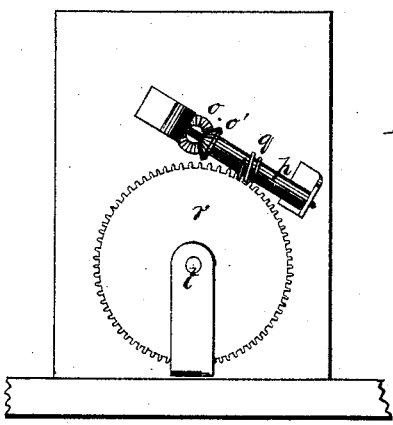
Fig. 4
Fig. 5. 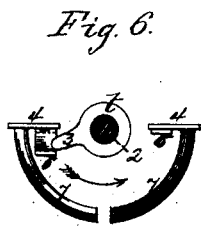 Fig. 6. 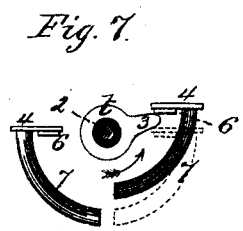 Fig. 7.
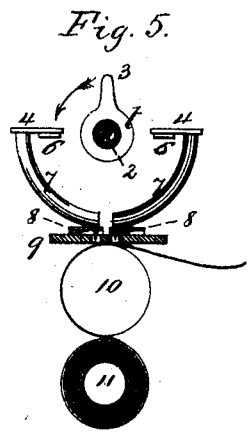
Fig. 9. 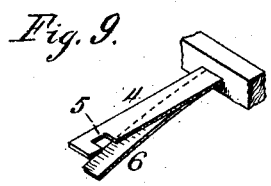 Fig. 8. 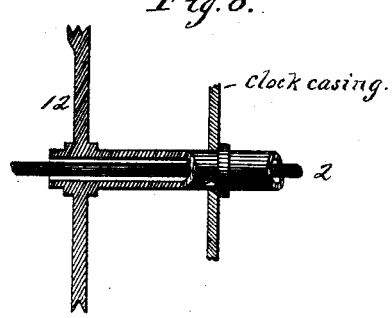
Witnesses Inventors

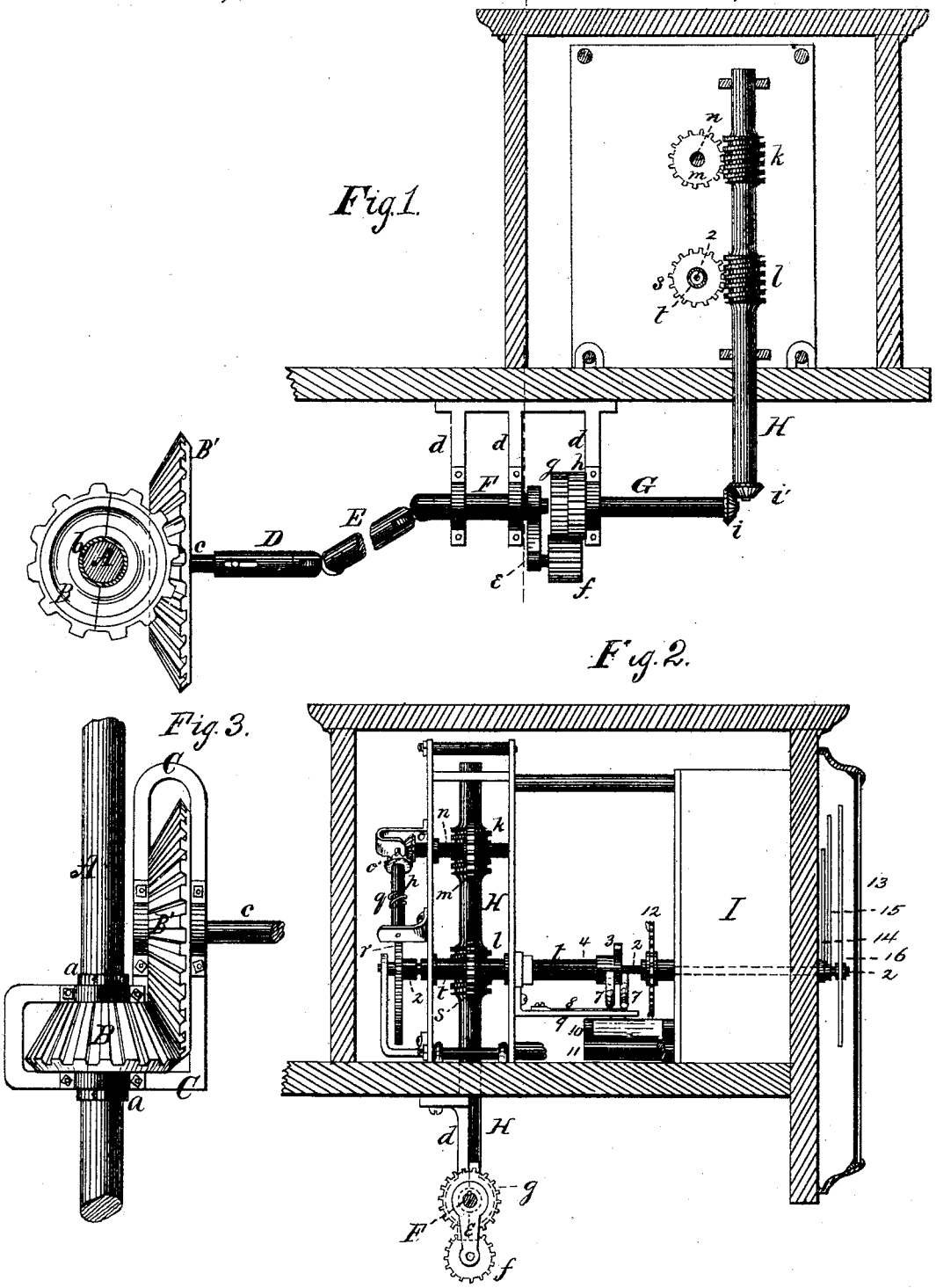

UNITED STATES PATENT OFFICE.

FRANCIS M. DUNLAP, OF ALLEGHENY, AND ROBERT MAGILL, OF PITTSBURG, ASSIGNORS OF A PART OF THEIR RIGHT TO BENJN. F. ASPER AND DAVID P. HOYLE, OF PITTSBURG, PENNSYLVANIA.

IMPROVEMENT IN COMBINED SPEED AND DISTANCE RECORDER AND INDICATOR.

Specification forming part of Letters Patent No. 196,643, dated October 30, 1877; application filed March 29, 1877.

*To all whom it may concern:*

Be it known that we, FRANCIS M. DUNLAP and ROBERT MAGILL, respectively of Allegheny and Pittsburg, in the county of Allegheny and State of Pennsylvania, have invented certain new and useful Improvements in Combined Speed Recorder and Indicator; and we do hereby declare the following to be a full, clear, and exact description of the invention, reference being had to the drawings herewith, forming a part of this specification, in which—

Figure 1 is a vertical longitudinal section. Fig. 2 is a vertical transverse section. Fig. 3 is a plan detail of axle-connections. Fig. 4 is a rear view of distance mechanism. Figs. 5, 6, and 7 are views showing the operation of distance-marking. Fig. 8 is a detail of time-marker and propeller. Fig. 9 is a perspective detail.

This invention relates to devices for the combined purpose of indicating and recording the speed and distance of wheeled vehicles, or for either purpose separately; and consists in the construction and combination of parts, substantially as hereinafter described and claimed.

It is obvious that such a device must be operated by the axle or wheel of the vehicle. In ordinary vehicles it matters not which wheel gives the motion; but as we design it particularly for use on railway-trains, and as the car-wheels are sometimes locked by the brakes, and the engine-drivers slip for want of traction, we prefer to take the motion from the axle of the pilot-wheels of the engine.

So much being prefaced, our invention is constructed and applied as follows: Upon the axle A of one pair of pilot-wheels (preferably the hind pair) we place a beveled gear, B, made in two halves, each being made with the half of a split collar, $b$, integral therewith. They are then firmly clamped on the axle by the clamps $a$ around the ends of collar $b$. Yoked on this collar is an L-shaped frame, C, journaled in which is a larger beveled gear, B′, at right angles to gear B, and having a short shaft, $c$, projecting rearwardly into the hollow end of a shaft, D, which is longitudinally slotted for the play of a pin on shaft $c$, thus allowing a telescoping of the two shafts to compensate for the movement caused by the swaying of the truck in making curves or irregularities of the roadway, or other causes.

A long tumbling-rod, E, provided at each end with a double knuckle-joint, as shown, carries the motion from shaft D, to which it is jointed below, up to a shaft, F, to which also it is jointed in the same manner. The shaft F is journaled in hangers $d$, projecting from the running-board of the engine just at the cab. After passing two of the hangers the shaft F terminates in a crank, $e$. Crank $e$ carries at its journaled extremity a loose idler, $f$, which, by the rotation of the crank, travels around the face of two pinions, $g$ and $h$. One of these, $g$, the nearest to the crank, is movable; the other, $h$, is fixed. Pinion $g$ is keyed on a shaft, G, which then passes through fixed pinion $h$ and hanger $d$, and terminates beyond in a miter-wheel, $i$. Fixed pinion $h$ has a certain number of teeth, and movable pinion $g$ has one tooth more, so that the effect of the travel of idler $f$ once around is to cause wheel $g$ to revolve through the distance of one tooth. Hence it takes as many revolutions of crank $e$ as pinion $h$ has teeth to produce a single revolution of the pinion $g$ and its shaft G. In the actual machine, as adapted to a ninety-inch pilot-wheel, we have on pinion $g$ twenty-two teeth, and twenty-one on pinion $h$, thus requiring twenty-two revolutions of crank $e$ to effect one revolution of shaft G.

With a miter-wheel, $i'$, the motion is now transmitted to a vertical shaft, H, rising through the running-board into the interior of a case containing the mechanism. The motion is still too rapid for practical use, and we further reduce it. Shaft H has two similar worms, $k$ and $l$, or they may be part of a continuous worm. One of these worms, $k$, meshes with a spur-wheel, $m$, on whose shaft, $n$, is fixed a miter-wheel, $o$, gearing with a similar wheel, $o'$, on a shaft, $p$, at right angles thereto. Shaft $p$ also has a worm, $q$, which drives a large mile-wheel, $r$. The worm $l$ on shaft H meshes with a spur-wheel, *s*, like wheel *m*, which is fixed on a hollow shaft, *t*, through which loosely passes the diminished shaft 2 of wheel *r*. On the opposite end of hollow shaft *t* is a cam or tripper, 3, which effects the recording of the distance traveled in the following manner: Projecting horizontally from the frame, on each side of shaft *t*, is a spring-arm, 4, having a slot or recess, 5, in the path of revolution of cam 3. The arms 4 are supplemented underneath by secondary spring-arms 6, which are solid under the slots 5 of arms 4, and fill up the space left by them. Now, it is obvious that in going downward, the tripper 3 will pass through slot 5, and the secondary spring-arms 6 will yield to let it pass; but in coming up, the cam will lift the two arms 4 and 6 till it revolves out of contact and releases them, when they will at once spring down to normal position. Depending from the outer ends of arms 4 are curved hammers 7, relatively so placed as to move in different vertical planes. One of these hammers will act by the forward movement of the engine, and the other by the backing of the engine, and the relative position of the hammers 7 effects the marking of the results side by side, so as to be distinguishable apart. The hammers at their lower ends converge and nearly meet, or they may lap. Under each is a spring-plate, 8, provided on its under side with a pointed stylus or marker, which, in action, is driven through a slot in the presser-plate 9, which projects from the frame. Under the plate 9 is a feed-roller, 10, over which a strip of paper is fed from a drum, 11, conveniently situated, by means to be explained further on.

To indicate the relations, operation, and effects so far, suppose the pilot-wheel is ninety inches in circumference, and we wish the hammers, or one of them, to fall at the end of each mile of travel. It will fall once for every revolution of tripper 3 or spur-wheel *s*; but for every revolution of wheel *s* there must be sixteen revolutions of shaft H and shaft G; for every revolution of shaft G there are twenty-two turns of crank *e* and shaft F or D; for every turn of shaft D or wheel B', axle A must turn twice—that is, for every seven hundred and four revolutions of pilot-wheel (exactly one mile of travel) we have one revolution of cam 3 and one stroke of the hammer.

A clock-movement, I, of ordinary construction is attached to the device inside the casing, and to the hollow shaft of the "minute-wheel," in close proximity to and facing the hammers 7, and with its periphery in contact with roller 10, is a toothed wheel, 12, having its teeth divided off conveniently—say, into sixty, to correspond with the divisions of an hour. This wheel is revolved by the clock-movement, as stated, and its teeth, impinging on the paper strip, effect the feeding of the latter in exact correspondence with the movements of time-piece I, and at the same time mark the minutes on the strip. To mark off the quarter-hours, we provide wheel 12 at the quarters with double-pointed teeth, and at the hour with a tooth having three points. The result on the strip will be a line of depressions indicating minutes, with a double dot at each quarter-hour, and a triple dot at the full hour.

By the co-operation of the double mechanism we have the record of the miles as they are traveled; and on the same strip, side by side with the distance, the time is accurately laid off, because the strip is fed by the wheel 12, and must necessarily move coextensively therewith.

The recording part of the device is entirely within the case, which may have a door with lock and key, for the superintendent or time-clerk, the engineer having no access thereto. For the latter's benefit, the outside is provided with a dial-face, 13, on which move the ordinary hour and minute hands 14 and 15 of the clock-movement I, and a speed-index, 16, collared on the shaft 2 of the mile-wheel *r*, which passes completely through the shafts of distance mechanism and time-movement, which are made hollow for the purpose. The hands 14, 15, and 16 being fitted on by friction-sleeves, it is evident that the engineer may move any or all of them in either direction without affecting the recording mechanism of the interior in any way.

The dial has the hours in one circle, and the miles in the other.

Having thus fully described our invention, we claim—

1. In a combined speed recorder and indicator, the combination, with the tubular main shaft *t* of the distance-marking mechanism, and the tubular shaft of the time-marking mechanism, operated by clock-work I, of the central shaft 2, passing completely through said tubular shaft, and communicating by gearing, substantially as described and shown, with the worm-shaft H, for the purpose set forth.

2. The combination of beveled gears B B' and L-shaped frame C, swinging on the collar of wheel B, and constituting a bearing for wheel B', substantially as described, whereby the position of wheel B' may vary to accommodate irregularities in the motion of axle A.

3. The combination of shaft F, having crank *e*, shaft G, carrying pinion *g*, idler *f*, and fixed pinion *h*, pinion *g* having one tooth more than pinion *h*, substantially as set forth.

4. The combination of worm *k*, wheel *m*, shaft *n*, miter-wheels *o* and *o'*, shaft *p* and its worm *q*, wheel *r*, and shaft 2, with an index, 16, and dial 13, substantially as described, whereby the distance is indicated on the dial.

5. The combination of worm *l*, wheel *s*, and shaft *t*, bearing the cam or tripper 3, with one or more trip-hammers, 7, substantially as described, whereby the hammer or hammers are caused to fall at given intervals of distance.

6. The combination of shaft *t* and tripper 3 with the recessed spring-arms 4 and subjacent secondary spring-arms 6, substantially as set forth, whereby arm 6 allows the descent of the tripper, but is lifted by it in ascending.

7. In combination with the clock-movement I, and operated by one of the shafts thereof, a time-marking wheel, 12, its teeth, at suitable intervals, being provided with two or more points, or not, substantially as and for the purposes specified.

In testimony that we claim the foregoing we have hereto set our hands and seals this 20th day of March, 1877.

F. M. DUNLAP.  [L. S.]
    ROBERT MAGILL.  [L. S.]

Witnesses:
 A. V. D. WATTERSON,
 MARSHALL BROWN.